United States Patent Office 3,021,322
Patented Feb. 13, 1962

3,021,322
TRISAZO CUPRIFEROUS DYESTUFFS
Marcel Jirou, Sotteville-les-Rouen, and Vassili Urné, Rouen, France, assignors to Compagnie Francaise des Matieres Colorantes, Paris, France, a French company
No Drawing. Filed Nov. 14, 1958, Ser. No. 773,842
Claims priority, application France Nov. 16, 1957
6 Claims. (Cl. 260—145)

The present invention relates to the cupriferous complexes of the trisazo dyestuffs of the general formulae:

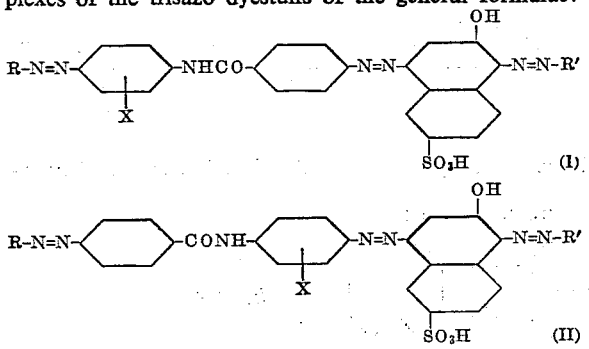

in which R represents the residue of salicylic acid or of a substituted derivative of this acid, R' represents a monosulpho-2-hydroxyl-1-naphthyl, monosulpho-1-hydroxy-2-naphthyl or acylamino-monosulpho-1-hydroxy-2-naphthyl residue, and X represents a hydrogen atom or a sulphonic group, the divalent copper in these complexes being attached to the trisazo dyestuffs, through the hydroxyl groups of the o:o'-dihydroxyazo grouping, in the proportion of one atom of metal per molecule of dyestuff. By "acylamino" groups are meant groups such as for example the following: acetylamino, benzoylamino, ethoxy - carbonylamino, methoxyethoxy-carbonylamino, simple ureido $H_2N—CO—NH—$ or ureido substituted on the $NH_2$ group.

The complexes of the present invention can be prepared by dealkylating metallisation of the dyestuffs of the general formulae:

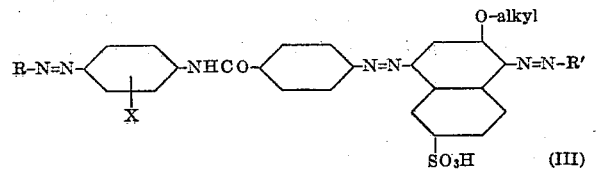

in which R, R' and X have the same significance as above, by means of divalent copper compounds. The O-alkyl group is converted into a hydroxyl group by hydrolysis; the copper becomes attached to the hydroxyl groups in the ortho-ortho' position to the azo linkage.

Excess of copper is generally necessary in order to bring about the complete hydrolysis of the O-alkyl group, and this excess leads in addition to the formation of a chelated complex between the copper and the hydroxyl and the carboxyl groups of the salicylic acid residue or its substituted derivative.

Once the metallisation is finished, it is important to destroy this chelated complex in order to obtain a dyestuff which is more easily soluble in water and of brighter shade. For this purpose, sequestering agents may be used, for example, the tetra-sodium salt of ethylene-diamine-tetra-acetic acid; the complex is selectively demetallised either by addition of the sequestering agent to the reaction mixture after the dealkylating metallisation, by subsequent treatment of the complex isolated from the reaction medium, by mixing the sequestering agent with the isolated and dried complex, or by addition of the sequestering agent to the dyebath.

The 1:1 complexes of the invention are particularly suitable for dyeing vegetable fibres, shades which are fast to light and to washing being obtained.

The examples below, in which the parts indicated are parts by weight, illustrate the present invention without restricting it.

Example 1

95.5 parts of the trisazo dyestuff of the formula:

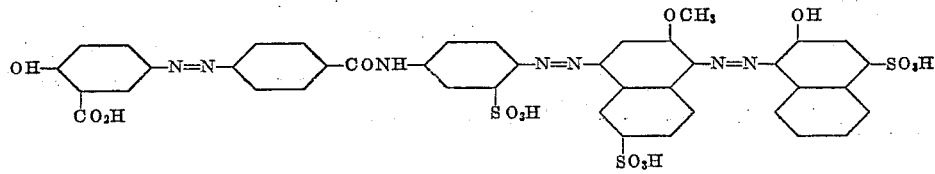

are dissolved in the form of the sodium salt in 2400 parts of water at 90° C. This solution is treated with 10 parts of sodium bicarbonate. A solution comprising 30 parts of crystalline copper sulphate, 150 parts of water and 56.5 parts of 20% by volume of ammonia is slowly added. The mixture is heated for 12 hours at 90–92° C. and the dyestuff is separated by the addition of sodium chloride. The paste of the cupric compound is taken up with 2500 parts of a 1% solution of the tetra-sodium salt of ethylene-diamine-tetra-acetic acid. The mixture is heated at 80–85° C. for 30 minutes and the dyestuff is reciprocated by the addition of sodium chloride; this dyestuff then only contains one atom of metal in its molecule. It dyes cellulosic fibres a green shade which verges on olive.

If, instead of treating the product from the copper treatment with the solution of the sequestering agent, it is ground with the latter without drying, a mixture is obtained which dyes cellulosic fibres the same shade.

Example 2

The 95.5 parts of the dyestuff used in Example 1 are replaced by 101.2 parts of the trisazo compound of the formula:

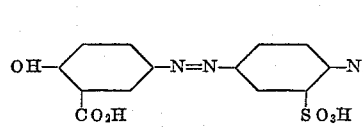

and the 30 parts of copper sulphate by 35 parts of copper sulphate. On operating under conditions similar to those of Example 1, a copper complex containing only one atom of metal per molecule of dyestuff is obtained after treatment with the sequestering agent. This complex dyes cellulosic fibres a bright olive green.

*Example 3*

The operation is as in Example 1, but 105.7 parts of the trisazo dyestuff of the following formula are used:

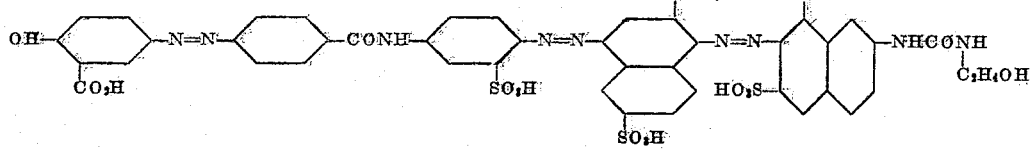

Once the metallisation is finished, a concentrated solution of the tetra-sodium salt of ethylenediamine-tetraacetic acid is introduced at 90° C. into the reaction liquid in such quantity that its concentration is equal to 1% in the mixture. After 30 minutes of agitation at 90° C., the dyestuff is isolated by adding sodium chloride to the liquid. The copper complex thus obtained contains only one atom of copper per molecule of dyestuff and dyes cellulosic fibres green.

*Example 4*

The copper complex of the trisazo dyestuff of the formula:

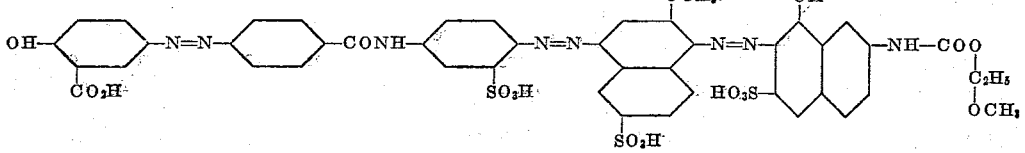

is prepared according to the directions in Example 2. The dyestuff obtained dyes cellulosic fibres olive green.

*Example 5*

107.2 parts of the trisazo dyestuff of the formula:

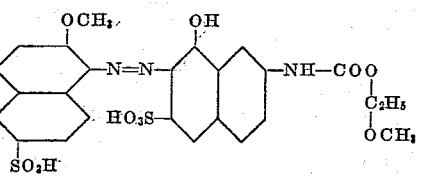

are formed into a chelated complex with copper and then selectively demetallised according to the process of Example 3. A dyestuff is obtained which dyes cellulosic fibres a yellowish shade verging on olive.

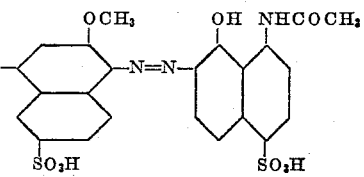

We claim:
1. Cupriferous complexes of trisazo dyestuffs selected from those of the general formulae:

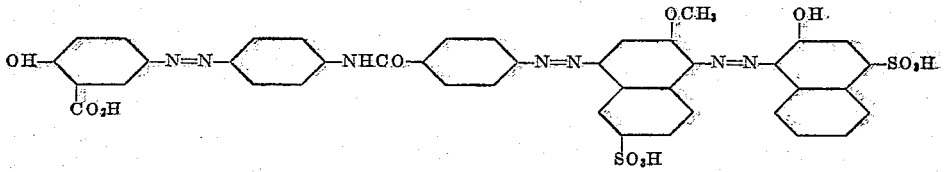

in which R represents the salicylic acid residue, R' represents a member selected from the group consisting of the acetylamino - monosulpho-1-hydroxynaphthyl, benzoylamino-monosulpho-1-hydroxynaphthyl, ethoxycarbonylamino-monosulpho-1-hydroxynaphthyl, methoxyethoxycarbonylamino - monosulpho-1-hydroxynaphthyl, ureidomonosulpho-1-hydroxynaphthyl, and hydroxyethylureidomonosulpho-1-hydroxynaphthyl fixed on the azo group at the position 2, and X represents a member selected from the group consisting of the hydrogen atom and the sulphonic group, the divalent copper in these complexes being attached to the trisazo dyestuff through the hydroxyl groups of the o:o'-dihydroxyazo grouping resulting from the hydrolysis of the O-alkyl grouping in the proportion of one atom of metal per molecule of dyestuff.

2. The copper complex of the dyestuff of the formula:

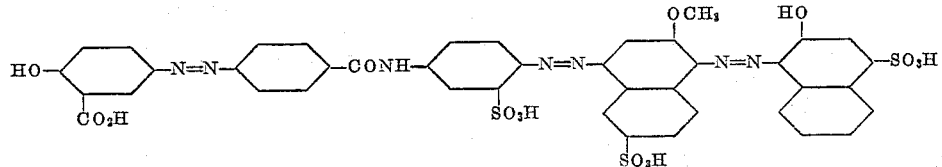

in which an atom of divalent copper is attached to the dyestuff by the o:o'-dihydroxyazo grouping resulting from the hydrolysis of the OCH₃ grouping.

3. The copper complex of the dyestuff of the formula:

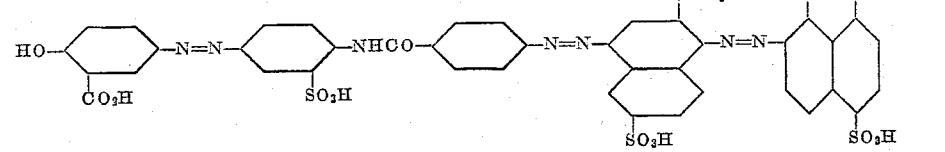

in which an atom of divalent copper is attached to the dyestuff by the o:o-dihydroxyazo grouping resulting from the hydrolysis of the OCH₃ grouping.

4. The copper complex of the dyestuff of the formula:

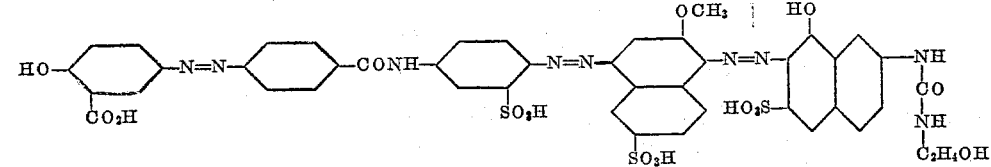

in which an atom of divalent copper is attached to the dyestuff by the o:o'-dihydroxyazo grouping resulting from the hydrolysis of the OCH₃ grouping.

5. The copper complex of the dyestuff of the formula:

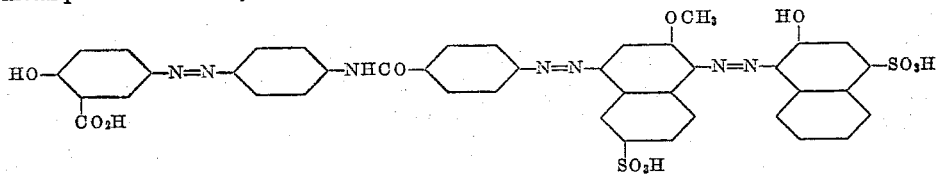

in which an atom of divalent copper is attached to the dyestuff by the o:o'-dihydroxyazo grouping resulting from the hydrolysis of the OCH₃ grouping.

6. The copper complex of the dyestuff of the formula:

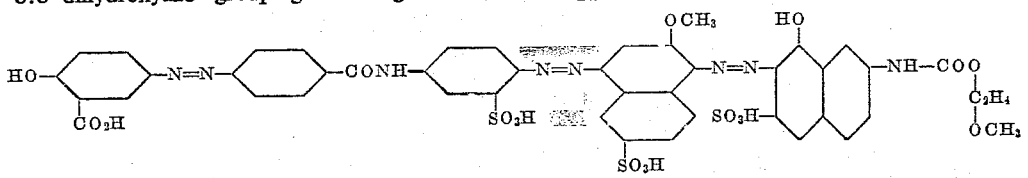

in which an atom of divalent copper is attached to the dyestuff by the o:o'-dihydroxyazo grouping resulting from the hydrolysis of the OCH₃ grouping.

References Cited in the file of this patent

UNITED STATES PATENTS

| | | |
|---|---|---|
| 2,381,599 | Krebser et al. | Aug. 7, 1945 |
| 2,659,721 | Bossard et al. | Nov. 17, 1953 |

FOREIGN PATENTS

| | | |
|---|---|---|
| 224,547 | Switzerland | Mar. 1, 1943 |
| 226,609 | Switzerland | July 16, 1943 |
| 226,611 | Switzerland | July 16, 1943 |
| 15,870 | Germany | June 7, 1956 |
| 1,005,214 | Germany | Mar. 28, 1957 |
| 543,916 | Canada | July 23, 1957 |
| 787,416 | Great Britain | Dec. 11, 1957 |